(12) United States Patent
Morishita et al.

(10) Patent No.: US 9,377,656 B2
(45) Date of Patent: Jun. 28, 2016

(54) LIQUID CRYSTAL DISPLAY DEVICE

(71) Applicant: Sharp Kabushiki Kaisha, Osaka-shi, Osaka (JP)

(72) Inventors: Katsuhiko Morishita, Osaka (JP); Takehiko Sakai, Osaka (JP); Shogo Nishiwaki, Osaka (JP); Masashi Chino, Osaka (JP); Masatoshi Kondo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/403,284

(22) PCT Filed: May 29, 2013

(86) PCT No.: PCT/JP2013/064837
§ 371 (c)(1),
(2) Date: Nov. 24, 2014

(87) PCT Pub. No.: WO2013/183505
PCT Pub. Date: Dec. 12, 2013

(65) Prior Publication Data
US 2015/0301411 A1  Oct. 22, 2015

(30) Foreign Application Priority Data
Jun. 5, 2012  (JP) ................................. 2012-128348

(51) Int. Cl.
G02F 1/133   (2006.01)
G02F 1/1343  (2006.01)
G02F 1/1362  (2006.01)
G02F 1/1335  (2006.01)

(52) U.S. Cl.
CPC ...... *G02F 1/134309* (2013.01); *G02F 1/13439* (2013.01); *G02F 1/133512* (2013.01); *G02F 1/133514* (2013.01); *G02F 2001/134372* (2013.01); *G02F 2001/136218* (2013.01)

(58) Field of Classification Search
CPC ................... G02F 1/134309; G02F 1/133514; G02F 1/133512; G02F 1/13439; G02F 2001/134372; G02F 2001/136218
See application file for complete search history.

(56) References Cited

U.S. PATENT DOCUMENTS

| 5,870,160 A | 2/1999 | Yanagawa et al. |
| 6,034,757 A | 3/2000 | Yanagawa et al. |

(Continued)

FOREIGN PATENT DOCUMENTS

| JP | 09-105918 A | 4/1997 |
| JP | 2007-286592 A | 11/2007 |
| JP | 2012-008408 A | 1/2012 |

OTHER PUBLICATIONS

Official Communication issued in International Patent Application No. PCT/JP2013/064837, mailed on Aug. 6, 2013.

*Primary Examiner* — Donald Raleigh
(74) *Attorney, Agent, or Firm* — Keating & Bennett, LLP

(57) ABSTRACT

According to the present invention, a liquid crystal display device driven by a transverse electric field system, which can prevent the occurrence of color unevenness in display, is provided. Namely, the liquid crystal display device of the present invention includes: a first substrate, a second substrate, and a liquid crystal layer interposed between the first substrate and the second substrate. The first substrate includes a first shield electrode with translucency, a supporting substrate, a light shielding layer, and a colored layer. The second substrate includes a common electrode and a pixel electrode, and assuming that the liquid crystal layer is the center of the liquid crystal display device, the first shield electrode is provided outwardly from the supporting substrate when seen from the center. The liquid crystal display device further comprises a first controlling circuit configured to apply a positive electric potential to the first shield electrode.

9 Claims, 12 Drawing Sheets

(56) References Cited

U.S. PATENT DOCUMENTS

| | | | |
|---|---|---|---|
| 6,108,066 A | 8/2000 | Yanagawa et al. | |
| 2003/0081164 A1* | 5/2003 | Sato | G02F 1/1337 349/141 |
| 2007/0242203 A1 | 10/2007 | Lee et al. | |
| 2012/0008072 A1 | 1/2012 | Lee et al. | |
| 2012/0270372 A1 | 10/2012 | Lee et al. | |
| 2013/0102098 A1 | 4/2013 | Lee et al. | |

* cited by examiner

LIQUID CRYSTAL DISPLAY DEVICE

TECHNICAL FIELD

The present invention relates to a liquid crystal display device. More specifically, the present invention relates to a liquid crystal display device for controlling on and off switching of display by utilizing a transverse electric field.

BACKGROUND ART

Liquid crystal display devices are devices for controlling transmission/shielding of light (on/off switching of display) by controlling the alignment of liquid crystal molecules having birefringence. The liquid crystal alignment modes of liquid crystal display devices include:
Twisted Nematic (TN) mode, in which the alignment of liquid crystal molecules having positive anisotropy of dielectric constant is twisted by 90° when viewed from the normal direction of a substrate;
Vertical Alignment (VA) mode, in which liquid crystal molecules having negative anisotropy of dielectric constant are aligned perpendicularly to a substrate surface; and,
In-Plane Switching (IPS) mode and Fringe Field Switching (FFS) mode, in which liquid crystal molecules having positive or negative anisotropy of dielectric constant are aligned horizontally to a substrate surface, and then a transverse electric field is applied to a liquid crystal layer.

As a driving mode of liquid crystal display devices, active matrix-type driving mode, in which an active element such as a Thin Film Transistor (TFT) is arranged in each pixel for achieving high image quality, has been popular. In an array substrate equipped with a plurality of TFTs and pixel electrodes, a plurality of scanning signal lines and a plurality of data signal lines are arranged such that they intersect with each other, and the TFTs are provided for each of these intersections. The TFTs are each connected to the pixel electrodes. The switching function of the TFTs controls the supply of image signals to the pixel electrodes. The array substrate or a counter substrate is further provided with common electrodes. A voltage is applied to the inside of the liquid crystal layer via a pair of electrodes.

However, liquid crystal display devices in the IPS mode or the FFS mode, which control the alignment of liquid crystal molecules by applying a transverse electric field, have such a specific disadvantage that display defects likely occur when high electric potential due to, for example, exterior static electricity is applied, unlike the case of liquid crystal display devices in the VA mode, in which electrodes are provided on the counter substrate.

Thus, to shield the influence of exterior static electricity, conventional liquid crystal display devices utilizing a transverse electric field have been designed, for example, to have a transparent electroconductive layer which is provided on the outer surface of the counter substrate, and is grounded (earthed) (For example, see Patent literature 1).

CITATION LIST

Patent Literature

Patent literature 1: JP-A-H09-105918

SUMMARY OF INVENTION

Technical Problem

The present inventors have made various studies on liquid crystal display devices which utilize a transverse electric field, and have noticed that some models of liquid crystal display devices showed color unevenness in display depending on an energizing time. Further studies have revealed that the models showing color unevenness had a variation in the shape of black matrices (hereinafter also referred to as BMs) provided on the counter substrate side and the color filters (hereinafter, also referred to as CFs) which partly overlap the BMs. Namely, the present inventors have found that each CF at the portions overlapping the BMs includes a different edge shape from one another in such models. It is considered that such variations in design result from a variation in the rate of development in the manufacturing process of the CFs, which is originally due to the variation in the materials of CFs.

The present inventors have made further intensive studies, and as a result, have found that such a variation in the edge shape affects the formation of electric field which is to be formed in the liquid crystal layer, and thus causes disturbance in the alignment of some liquid crystal molecules, which leads to appearance of color unevenness in display.

The present invention has been made in view of the foregoing state of the art. That is, the present invention has an object to provide a transverse field-type liquid crystal display device which can prevent the occurrence of color unevenness in display.

Solution to Problem

The present inventors have made various studies on methods for decreasing color unevenness in display, and focused on shield electrodes, which have generally been used in a transverse electric field mode and is to be arranged on the outer surface of the counter substrate. Then, the present inventors have found that disturbance in the alignment of liquid crystal molecules in the liquid crystal layer can be decreased by continuously applying a positive electric potential to a shield electrode instead of grounding (earthing) the shield electrode. The details are described below referring to examples of liquid crystal display devices in the FFS mode, together with drawings.

FIGS. 10 to 13 are schematic sectional views of a conventional liquid crystal display device in an FFS mode (Comparative Examples). FIGS. 10 and 12 have additional equipotential lines in the views. FIGS. 11 and 13 have additional contour lines of the tilt distribution in the views. In FIGS. 10 and 11, the edge shapes of the CFs at the portions overlapping the BMs are normal (tapered). In FIGS. 12 and 13, the edge shapes of some CFs at the portions overlapping the BMs are not normal (not tapered). The "tilt" here refers to the degree of inclination of liquid crystal molecules to each substrate surface.

As illustrated in FIGS. 10 to 13, a liquid crystal display device in the FFS mode includes an array substrate 110, a counter substrate 120, and a liquid crystal layer 130 which is interposed between the array substrate 110 and the counter substrate 120. The array substrate 110 includes a supporting substrate 121, common electrodes 115, a first insulating film 122, a data signal line 113, a second insulating film 123, and pixel electrodes 111, which are stacked in the stated order from the bottom towards the liquid crystal layer 130. The counter substrate 120 includes a shield electrode 170, a supporting substrate 141, a black matrix (BM) 142, color filters (CFs) 143, and an overcoat layer (hereinafter also referred to as an OC layer) 144, which are stacked in the stated order from the top towards the liquid crystal layer. The shield electrode 170 is grounded, and has a 0 V electric potential.

Comparison of FIG. 10 and FIG. 12 reveals that the structure (A), in which the edge shapes of the CFs 143 at the portions overlapping the BM 142 are normal, is different from the structure (B), in which the edge shapes of the CFs 143 at the portions overlapping the BM 142 are not normal, in the patterns of formed equipotential lines. This is obvious from the number of equipotential lines formed between substrates, namely, the structure (A) shows nine equipotential lines, whereas the structure (B) shows ten. Some of the equipotential lines are formed such that they surround the pixel electrode 111, and thus dense electric fields are formed.

Comparison of FIG. 11 and FIG. 13 reveals that the structures (A) and (B) are different from each other in their tilt distributions. They both have domains in which the tilt angle variations are large. The domains are formed in the display area (a region not overlapping the BM).

FIGS. 14 to 17 are schematic sectional views of liquid crystal display devices of the present invention in an FFS mode. FIGS. 14 and 16 have additional equipotential lines in the views. FIGS. 15 and 17 have additional contour lines of the tilt distribution in the views. In FIGS. 14 and 15, the edge shapes of the CFs at the portions overlapping the BM are normal. In FIGS. 16 and 17, the edge shapes of the CFs at the portions overlapping the BM are not normal. The structures are similar to conventional FFS mode liquid crystal display devices except that a positive electric potential (+30 V) is applied to the shield electrode 70.

Comparison of FIGS. 14 and 16 reveals that the structure (C), in which the edge shapes of CFs 43 at the portions overlapping a BM 42 are normal, is different from the structure (D), in which the edge shapes of CFs 43 at the portions overlapping the BM 42 are not normal, in the patterns of formed equipotential lines. However, while the number of equipotential lines formed between substrates is nine (in the structure (A)) or ten (in the structure (B)) in the examples of the conventional devices, the number is greatly decreased in the present invention, as three (in the structure (C)) or two (in the structure (D)). Equipotential lines are not formed such that they surround a pixel electrode 11 in the FIGS. 14 and 16, and therefore sparse electric fields are formed. Comparison of liquid crystal display devices including a normal edge shape and including an edge shape which is not normal reveals that liquid crystal display devices of conventional one and of the present invention are common in that the difference of the numbers of these equipotential lines is one. However, the number of the equipotential lines is as many as nine or ten in the conventional liquid crystal display devices. Thus, the influence on the amount and speed of the charge is heavy, and display unevenness more easily occurs.

Comparison of FIGS. 15 and 17 reveals that the structures (C) and (D) are different from each other in their tilt distributions. They both have domains in which the tilt angle variations are large. However, the area in which the domains are formed are covered by the BM, and therefore, display is not affected. Contrary to FIGS. 11 and 13, the display area does not have domains in which the tilt angle variations are large.

The present inventors have made further studies, and found that, when a negative electric potential is applied to a shield electrode, the effect of decreasing color unevenness in display is not developed irrespective of whether the edge shapes of the CFs are normal or not.

FIGS. 18 and 19 are schematic sectional views of liquid crystal display devices (Referential Example) in an FFS mode when a negative electric potential is applied to a shield electrode. FIG. 18 has additional equipotential lines in the view. FIG. 19 has additional contour lines of the tilt distribution in the view. The structures are similar to conventional FFS mode liquid crystal display devices or FFS mode liquid crystal display devices of the present invention except that a negative electric potential (=−30 V) is applied to a shield electrode 270.

As illustrated in FIG. 18, nine equipotential lines are formed between the substrates. Some of the equipotential lines are formed such that they surround a pixel electrode 211, and therefore dense electric fields are formed.

As illustrated in FIG. 19, an example of the liquid crystal display device in which a negative electric potential is applied to the shield electrode 270 has domains in which tilt angle variations are large. The domains are formed in the display area (the region not overlapping the BM). It will be understood from comparison of FIGS. 11 and 13 that the domains shows a larger tilt angle variation than the domains formed in a conventional FFS mode liquid crystal display device. Thus, in the case where a negative electric potential is applied to a shield electrode, the area in which color unevenness in display easily occurs is rather wider than the case where the electric potential is evenly kept to 0 V.

Based on the above studies, the present inventors have concluded that color unevenness in display can be decreased by applying a positive electric potential to the shield electrode, not by keeping the electric potential to 0 V, and not by applying a negative electric potential. The present inventors thus found that the above findings can successfully solve the above problems, and attained to the present invention. The above description refers to the FFS mode as an example, but the same shall apply to a mode which forms a transverse electric field.

Namely, an aspect of the present invention directs to a liquid crystal display device including: a first substrate, a second substrate, and a liquid crystal layer interposed between the first substrate and the second substrate; the first substrate including a first shield electrode with translucency, a supporting substrate, a light shielding layer, and a colored layer; the second substrate including a common electrode and a pixel electrode; assuming that the liquid crystal layer is the center of the liquid crystal display device, the first shield electrode being provided outwardly from the supporting substrate when seen from the center; and the liquid crystal display device further including a first controlling circuit configured to apply a positive electric potential to the first shield electrode.

The configuration of the liquid crystal display device of the present invention is not especially limited by other components as long as it essentially includes such components. The liquid crystal display device will be described below in detail.

The liquid crystal display device includes a first substrate, a second substrate, and a liquid crystal layer interposed between the first substrate and the second substrate. The anisotropy of dielectric constant of the liquid crystal materials in the liquid crystal layer may be positive or negative.

The first substrate includes a first shield electrode with translucency, a supporting substrate, a light shielding layer (a black matrix), and a colored layer (color filter). Assuming that the liquid crystal layer is the center of the liquid crystal display device, the first shield electrode is provided outwardly from the supporting substrate when seen from the center. One of objects of providing the first shield electrode is to protect the liquid crystal layer from exterior influences caused by, for example, static electricity. The first shield electrode is preferably formed in a wide range on the supporting substrate. Thus, a translucent material is used to ensure transmissivity. That is, the first shield electrode is preferably a planar one.

The second substrate includes a common electrode and a pixel electrode. The common electrode and the pixel electrode are provided for forming a transverse electric field in the liquid crystal layer. Examples of the pixel electrode include a pixel electrode in a comb-tooth structure. In other words, the comb-tooth structure means a structure which includes a plurality of slits formed in a pixel electrode. Specific examples of the comb-tooth structure include (i) a structure in which one end of the slits is open, but the other end is closed, and (ii) a structure in which both ends of the slits are closed. Examples of the common electrode include an electrode including the comb-tooth structure and a planar structure. A liquid crystal display device in the FFS mode is realized when the pixel electrode includes the comb-tooth structure, and the common electrode is planar, and an insulating film is provided between the pixel electrode and the common electrode to separate them into different layers. On the contrary, a liquid crystal display device in the IPS mode is realized when both of the pixel electrode and the common electrode include comb-tooth structures, and they are placed on the same layer.

The liquid crystal display device includes a first controlling circuit configured to apply a positive electric potential to the first shield electrode. The magnitude of the positive electric potential is not particularly limited as long as it is larger than 0, but preferably within the range from +5 to +30 V. Examples of the first controlling circuit include a display controlling circuit which generates signals with a constant value. Exterior power source placed on the outside of a panel may also be used as the first controlling circuit.

Preferred embodiments of the liquid crystal display device will be described below in detail.

It is preferred that the liquid crystal display device further includes a scanning signal line, a second shield electrode with translucency, and a second controlling circuit configured to apply a negative electric potential to the second shield electrode, assuming that the liquid crystal layer is the center of the liquid crystal display device, the second shield electrode is provided outwardly from the supporting substrate when seen from the center, and the second shield electrode overlappingly extends along the scanning signal line.

Normally, negative gate signals are supplied to the scanning signal lines in the off state. This may result in frequent occurrence of disturbance in the alignment of the liquid crystal molecules at the portions overlapping scanning signal lines. The presence of the area in which disturbance in the alignment of the liquid crystal molecules may be a cause of light leakage. Thus, it is normal that color filters are not provided at the portions overlapping scanning signal lines, and light shielding layers are provided instead. However, even if the scanning signal lines are covered with light shielding layers, disturbance in the alignment of the liquid crystal molecules may occur in some cases. That is, when the liquid crystal layer contains a large amount of ionic impurities, disturbance in the alignment of the liquid crystal molecules may occur in positions overlapping the color filters beyond the covered area after a long-term energization. Thus, in this embodiment, separately from the first shield electrode, the second shield electrode, to which a negative electric potential is applied, is designed to extend such that it overlaps along scanning signal lines. This enables effective suppression of disturbance in the alignment of the liquid crystal molecules because the gate electric field is canceled by the negative electric potential which is applied to the second shield electrode. The magnitude of the negative electric potential is not particularly limited as long as it is smaller than 0, but preferably within the range from −30 to −5 V. Examples of the second controlling circuit include a display controlling circuit which generates signals with a constant value. Exterior power source placed on the outside of a panel may also be used as the second controlling circuit.

Advantageous Effects of Invention

According to the present invention, a liquid crystal display device driven by a transverse electric field system, which can prevent the occurrence of color unevenness in display, can be provided.

DESCRIPTION OF EMBODIMENTS

Figure 1:
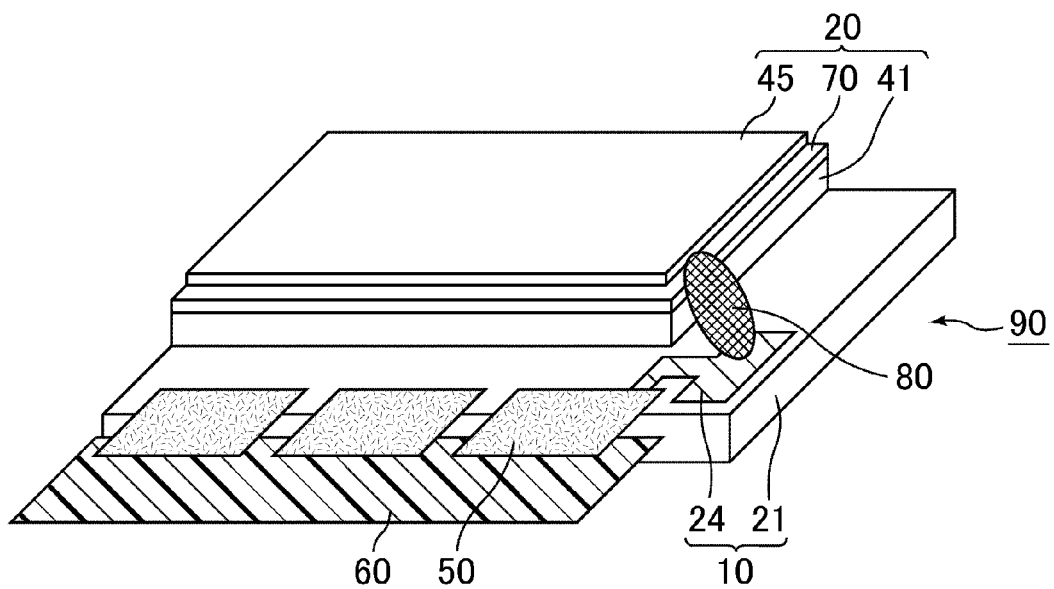
FIG. 1 is a schematic perspective view illustrating a state of the alignment of the liquid crystal in a liquid crystal display device of the Embodiment 1.

The present invention will be mentioned in more detail referring to the drawings in the following embodiments, although the present invention is not limited to these embodiments.

Specifically, the liquid crystal display devices of Embodiments 1 to 3 below can be applied to televisions, personal computers, mobile phones, car navigation systems, information displays, or the like.

Embodiment 1

The Embodiment 1 illustrates an example of a liquid crystal display device in an FFS mode. FIG. 1 is a schematic perspective view illustrating the state of the alignment of liquid crystal molecules in the liquid crystal display device of the Embodiment 1. The liquid crystal display device of the Embodiment 1 includes a liquid crystal display panel 90, which includes a TFT substrate 10, a counter substrate 20, and a liquid crystal layer interposed between the TFT substrate 10 and the counter substrate 20, as well as a flexible substrate 50, and a circuit substrate 60.

The TFT substrate 10 includes a supporting substrate 21 as a base, as well as various wirings, electrodes, and the like, which are arranged on the supporting substrate 21. The counter substrate 20 includes a supporting substrate 41 as a base, as well as color filters, black matrices and the like, which are arranged on the supporting substrate 41. A shield electrode 70 with translucency is provided on the back surface of the supporting substrate 41 on the side of the counter substrate 20, that is, assuming that the liquid crystal layer is the center, on the outer surface of the supporting substrate 41 when seen from the center. On the further outer surface of the shield electrode 70, a polarizing plate 45 is provided. As the supporting substrate 21 or 41, a glass plate having a thickness of approximately 0.7 mm may be used, for example.

On the lateral side of the liquid crystal display panel 90, the circuit substrate 60 is arranged. On the flexible substrate 50 and the TFT substrate 10, a plurality of wirings are formed such that a given electric potential should be applied from the controlling circuit in the circuit substrate 60 to the TFT substrate 10.

More specifically, the shield electrode 70 according to the Embodiment 1 falls into a first shield electrode to which a positive electric potential is applied, and a second shield electrode to which a negative electric potential is applied. On the circuit substrate 60, a first controlling circuit for applying a positive electric potential to the first shield electrode and a second controlling circuit for applying a negative electric potential to the second shield electrode are formed. On the flexible substrate 50, given wirings are formed such that a given electric potential should be applied from each controlling circuit to the corresponding shield electrodes, and on the TFT substrate 10, terminals 24 are equipped. On the top surface of the TFT substrate 10 and the lateral side of the counter substrate 20, an electroconductive material 80 made of, for example, silver paste is provided. Such an electroconductive material establishes continuity between each shield electrode and the corresponding controlling circuit. The electroconductive material 80 is not particularly limited in its structure, materials, and the like as long as it is electroconductive. The electric potential to be applied to the first shield electrode is, for example, within the range from +5 to +30 V. The electric potential to be applied to the second shield electrode is, for example, within the range from −5 to −30 V. The magnitude of the electric potential may be measured by a tester.

Figure 2:
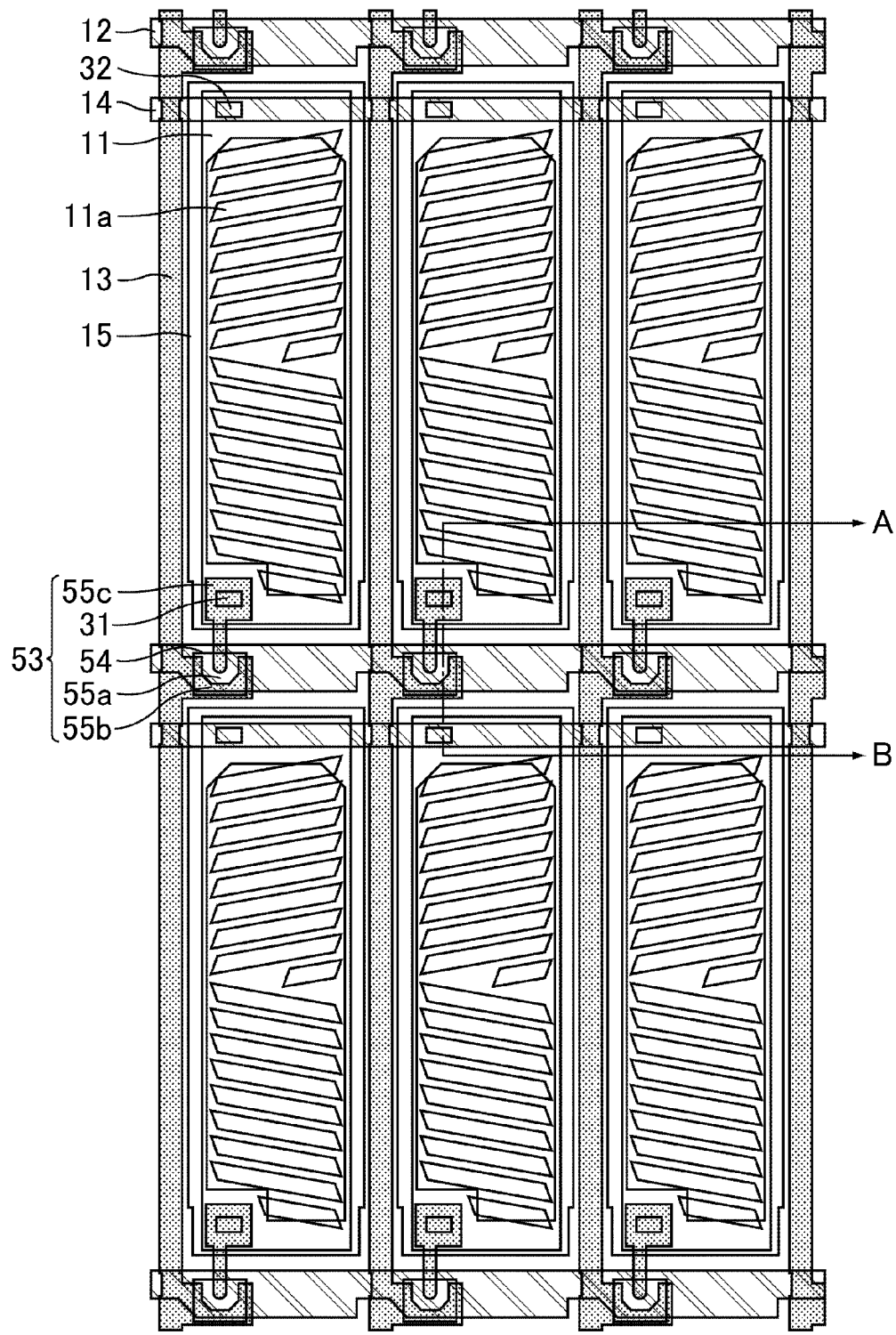
FIG. 2 is a schematic plan view illustrating a pixel structure of a TFT substrate in the Embodiment 1.

FIG. 2 is a schematic plan view illustrating the pixel structure of the TFT substrate in the Embodiment 1. FIG. 2 illustrates an example of the pixel structure in which a pixel consists of three sub pixels which are aligned in a row direction. The number and the way of arrangement of sub pixels in one pixel, however, are not particularly limited. As illustrated in FIG. 2, scanning signal lines 12 and data signal lines 13 in the plan view of the TFT substrate in the Embodiment 1 are arranged such that they intersect each other and surround a pixel electrode 11. In the neighborhood of the intersection of the scanning signal line 12 and the data signal line 13, a TFT (thin film transistor) 53 is provided. Between each pair of the scanning signal lines 12, common signal lines 14 are provided in parallel with the scanning signal lines 12. The common signal lines 14 are connected to common electrodes 15 via contacting portions 32 which penetrate an insulating film.

The TFT 53 is a switching element including a semiconductor layer 54, a gate electrode 55a, a source electrode 55b, and a drain electrode 55c. A part of the scanning signal line 12 doubles as the gate electrode 55a. The source electrode 55b includes a structure branched from the data signal line 13, and bends so as to surround the tip of the drain electrode 55c. The drain electrode 55c extends towards the pixel electrodes 11. The drain electrode 55c includes a structure which is wide in a position overlapping the pixel electrode 11, and is connected to the pixel electrode 11 via a contacting portion 31 which penetrates an insulating film. The gate electrode 55a and the semiconductor layer 54 overlap each other with a gate insulating film interposed therebetween. The source electrode 55b is connected to the drain electrode 55c via the semiconductor layer 54. The amount of electric current flowing through the semiconductor layer 54 is controlled by scanning signals input into the gate electrodes thorough the scanning signal lines 12. Then, the transmission of the input data signals is controlled via the data signal lines 13 in the order of the source electrodes 55b, the semiconductor layers 54, the drain electrodes 55c, and the pixel electrodes 11. The electric potential of the scanning signals in the off state is −20 to −5 V. The electric potential of the data signals is 0 to +20 V.

The pixel electrodes 11 are comb-tooth electrodes in which a plurality of the pixel electrodes are arranged in every region which is defined by the scanning signal lines 12 and the data signal lines 13, and the periphery thereof forms a substantially rectangular shape. In the pixel electrodes 11, a plurality of slits 11a are formed. The slits 11a in the pixel electrodes 11 establish an arc-shaped electric field between the pixel electrodes 11 and the common electrodes 15. The slits 11a each extend in a direction inclining by an angle of several degrees with respect to the direction which is parallel with the longitudinal direction of the scanning signal lines 12. The slits 11a are not formed in the neighborhood of the region including the contacting portion 31 which links the drain electrodes 55c and the pixel electrodes 11. Any pair of a plurality of the slits 11a in the pixel electrodes 11 include a shape symmetrical to each other with respect to the border line which bisects the vertical side of the pixel electrode 11. Such a symmetrical structure enables to arrange the alignment of the liquid crystal in a well-balanced manner.

The Embodiment 1 employs a dot-reversal drive, in which data signals with different polarities are respectively supplied to two pixel electrodes which are adjacent to each other in a vertical or horizontal direction. Such data signals may be produced in a driving circuit of data signal lines.

To the common electrodes 15, common signals which are maintained at a constant value are supplied via the common signal lines 14. The electric potential of the common signals is +5 to +10 V. The common electrodes 15 are each formed in every region which is defined by the scanning signal lines 12 and the data signal lines 13. When conduction paths of other wirings are established, it is not necessary to divide the common electrodes 15 separately as mentioned above, and the common electrodes 15 may be formed as an integrated wider structure.

Figure 3:
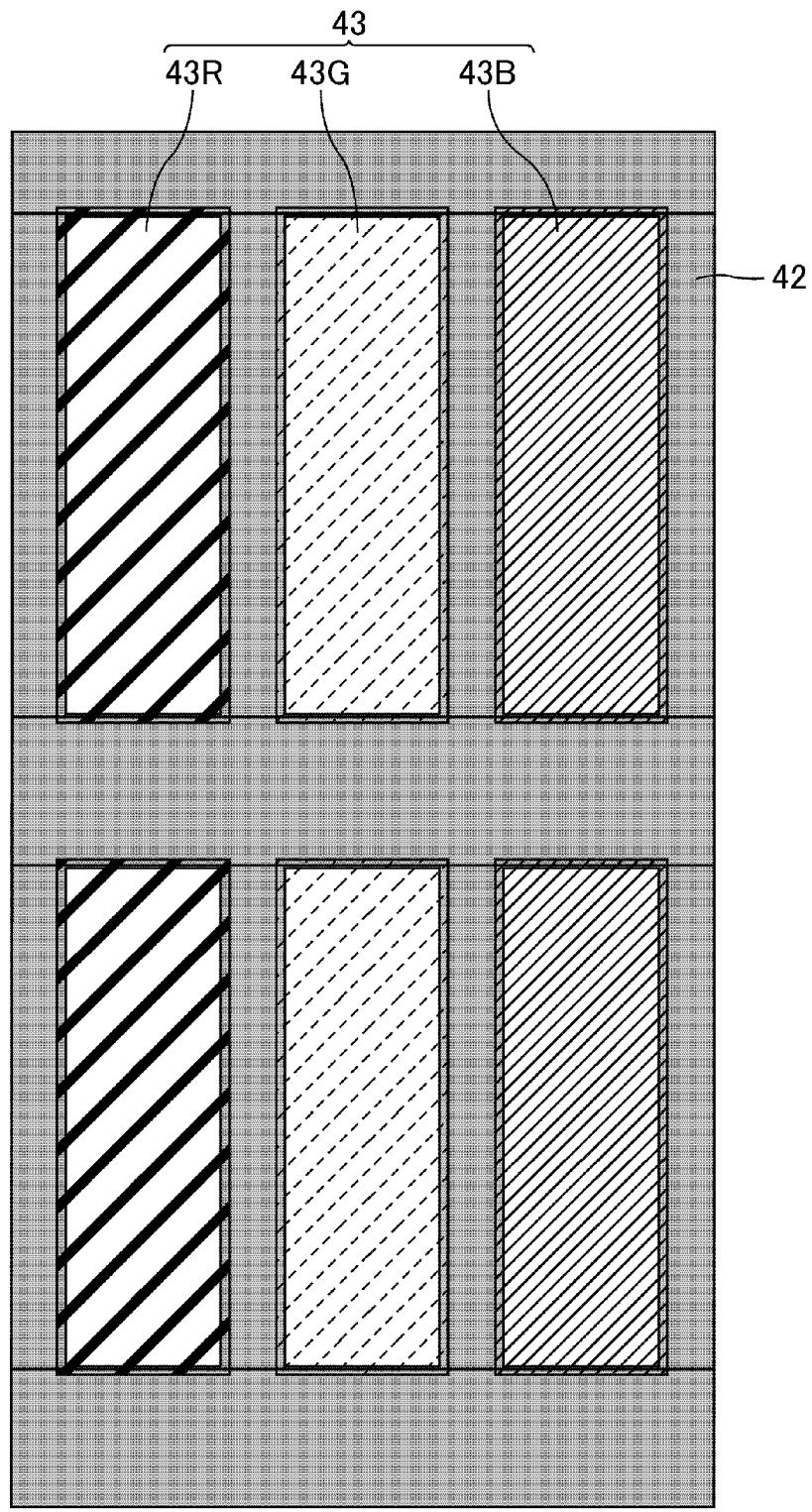
FIG. 3 is a schematic plan view illustrating a pixel structure of a counter substrate in the Embodiment 1.

FIG. 3 is a schematic plan view illustrating a pixel structure of the counter substrate in the Embodiment 1. As illustrated in FIG. 3, the counter substrate of the Embodiment 1 in a plan view includes color filters (CFs) 43 in every region corresponding to the pixel electrodes of the TFT substrate. Further, black matrices (BMs) 42 are arranged in a lattice so as to surround each of CFs 43. FIG. 3 shows an example in which a red color filter 43R, a green color filter 43G, and a blue color filter 43B are aligned in a row direction. The type, the number, and the way of arrangement of the color filters which constitute a pixel, however, are not particularly limited in the Embodiment 1.

Figure 4:
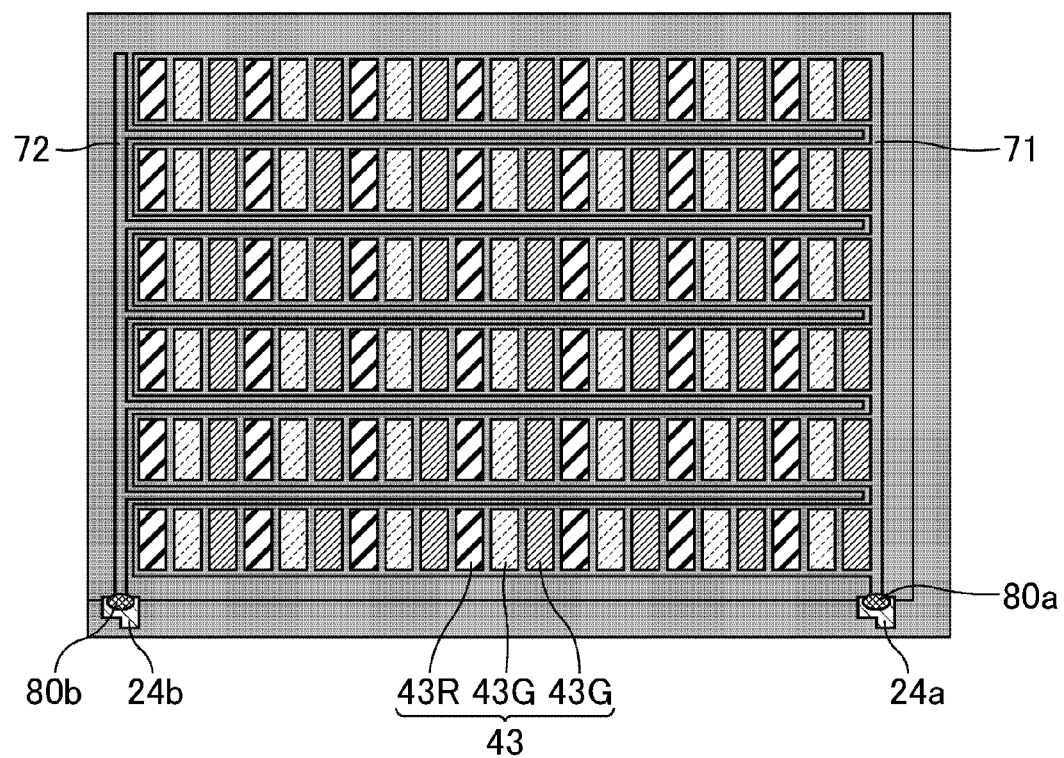
FIG. 4 is a schematic plan view illustrating the wider view of the counter substrate in the Embodiment 1.

FIG. 4 is a schematic plan view illustrating the wider view of the counter substrate in the Embodiment 1. As illustrated in FIG. 4, a first shield electrode 71, to which a positive electric potential is to be applied, are provided, extending in a row direction so as to overlap a plurality of color filters 43. Further, it extends in a column direction along the periphery of the display area to establish the connection between the portions which extend in a row direction. The reason why the first shield electrode 71 extends in a row direction is to prevent the scanning signal lines from overlapping, and to extend in a direction parallel with the scanning signal lines. Thus, when the pixel electrodes, color filters, and the like are arranged in a different pattern from those of the example illustrated in FIG. 4, the first shield electrode 71 may be appropriately modified according to the pattern.

As illustrated in FIG. 4, a second shield electrode 72, to which a negative electric potential is to be applied, are provided, extending lengthwise in a row direction along scanning signal lines so as to overlap the scanning signal lines. Further, it extends lengthwise in a column direction along the periphery of the display area to establish the connection between the portions which extend in a row direction.

The end parts of the extending portions of the first shield electrode 71 which extend in a column direction are connected to a terminal 24a via an electroconductive material (e.g. silver paste) 80a, and are configured to be connected to the first controlling circuit of the circuit substrate which is exteriorly fixed. The end parts of the extending portions of the second shield electrode 72, which extend in a column direction are connected to a terminal 24b via an electroconductive material (e.g. silver paste) 80b, and are configured to be connected to the second controlling circuit of the circuit substrate which is exteriorly fixed.

Such a pattern enables an efficient arrangement of both of the first shield electrode 71 and the second shield electrode 72 on the outer surface of the counter substrate.

As described above, the arrangement of the first shield electrode 71 to which the positive electric potential is applied enables to suppress disturbance in the alignment of the liquid crystal in the region (the display region) overlapping the color filters 43, and to thereby decrease color unevenness in display.

Figure 5:
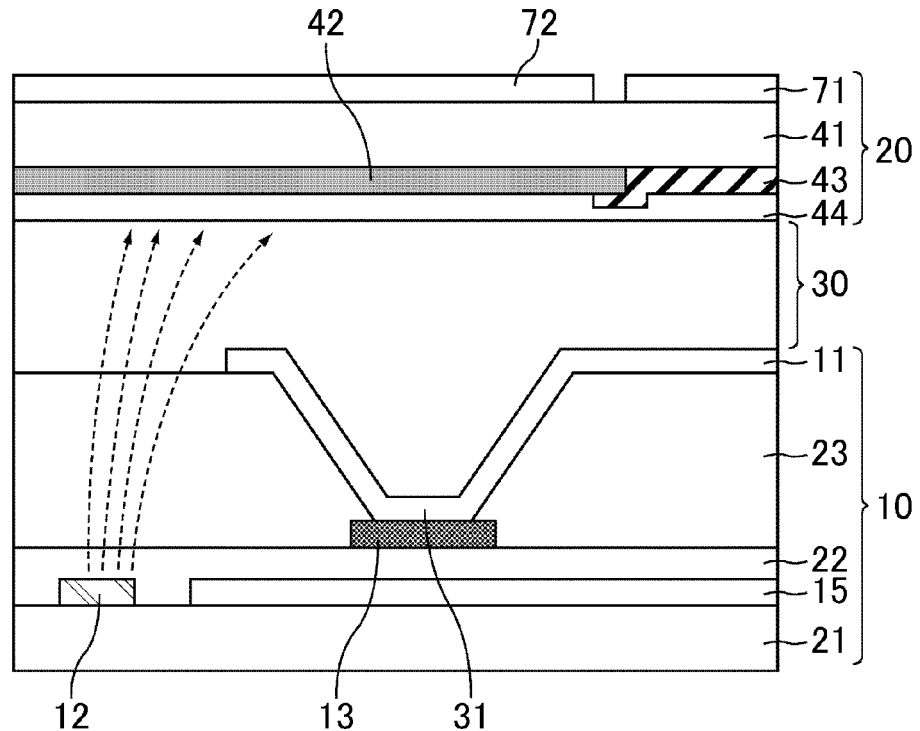
FIG. 5 is a schematic sectional view of FIG. 2 taken along the line A-B.

FIG. 5 is a schematic sectional view of FIG. 2 taken along the line A-B. As illustrated in FIG. 5, the liquid crystal display device of the Embodiment 1 includes the TFT substrate 10, the counter substrate 20, and the liquid crystal layer 30 interposed between the TFT substrate 10 and the counter substrate 20. The liquid crystal layer 30 contains liquid crystal molecules, and the molecules are aligned in a direction parallel with the face of each of the substrates 10 and 20 in a voltage unapplied state. The TFT substrate 10 includes a supporting substrate 21 as a base, and the scanning signal lines 12 and the common electrodes 15 which are provided on the surface on the side of the liquid crystal layer 30 of the supporting substrate 21. On the scanning signal lines 12 and the common electrodes 15, a gate insulating film (a first insulating film) 22 is provided. On the gate insulating film 22, the data signal lines 13 are provided. On the data signal lines 13, a passivation film (a second insulating film) 23 is provided, and on the passivation film 23, the pixel electrodes 11 are provided. The pixel electrodes 11 are connected to the data signal lines 13 via the contacting portions 31 which penetrate the passivation film 23.

The counter substrate 20 includes the supporting substrate 41 as a base, and the black matrices (BMs) 42 and the color filters (CF) 43 which are provided on the surface on the side of the liquid crystal layer 30 of the supporting substrate 41. On the surface on the side opposite to the side of the liquid crystal layer 30 of the supporting substrate 41, the first shield electrode 71 and the second shield electrode 72 are provided. The BMs 42 are installed such that they should cover a various wirings such as the scanning signal lines 12, as well as electrodes which constitute the TFT, and the contacting portion. The first shield electrode 71 is provided in a position overlapping the CFs 43. The second shield electrode 72 is provided in a position overlapping the BMs 42.

The signal applied to the scanning signal lines 12 in the off state is negative. Thus, when the electric potential of the shield electrodes is 0 V, a gate electric field is formed in the liquid crystal layer 30 like the arrows illustrated in the FIG. 5, and disturbance in the alignment of the liquid crystal molecules are caused at the portions overlapping the scanning signal lines 12 in the liquid crystal layer 30. However, the gate electric potential is canceled since a negative electric potential is applied to the second shield electrode 72, as illustrated in FIG. 5. Thus, disturbance in the alignment of the liquid crystal molecules is decreased and thereby generation of color unevenness in display can be suppressed.

Figure 6:
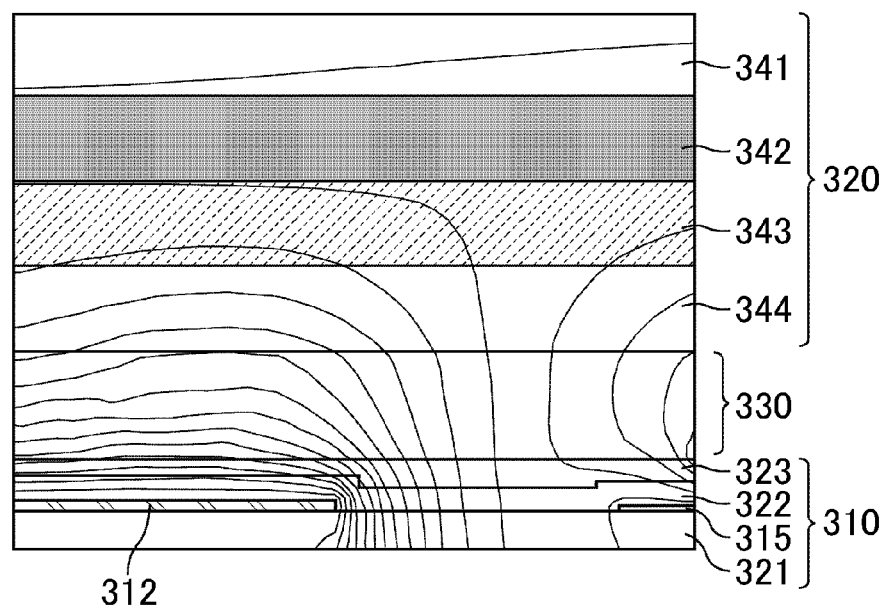
FIG. 6 is a schematic sectional view illustrating a state when a 0 (V) electric potential is applied to the second shield electrode.
Figure 7:
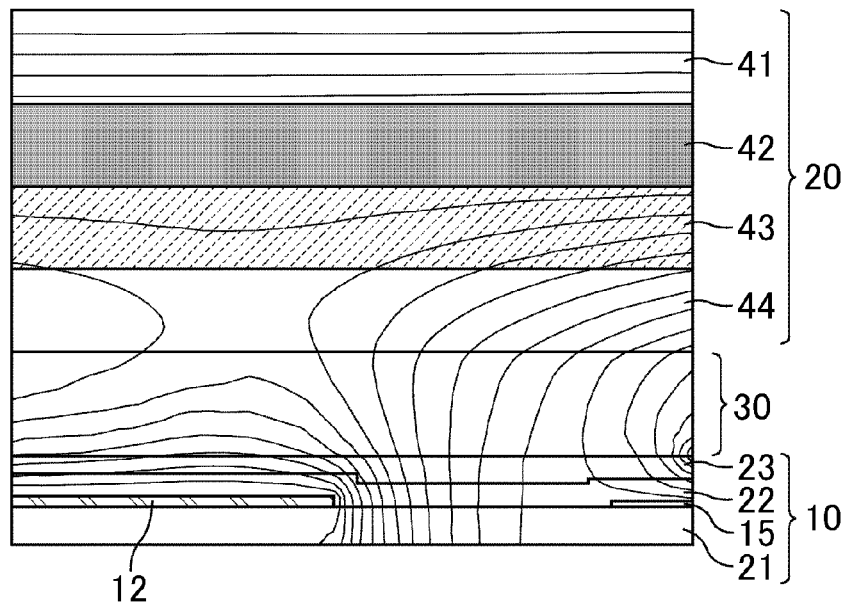
FIG. 7 is a schematic sectional view illustrating a state when a −30 (V) electric potential is applied to the second shield electrode.

In the followings, operational advantages by the presence of the second shield electrode are explained in detail, referring to FIGS. 6 and 7. FIG. 6 denotes a state when a 0 (V) electric potential is applied to the second shield electrode. FIG. 7 denotes a state when a negative electric potential of −30 V is applied to the second shield electrode. As illustrated in FIG. 6, when a 0 (V) electric potential is applied to the second shield electrode, dense electric field is formed in correlation with the gate electric potential. Such an electric field is formed in the region which overlaps the BM, and thus, direct influence on the display image by disturbance in the alignment of the liquid crystal molecules is normally little.

However, in such a case as when the liquid crystal display device is energized for a long time, disturbance in the alignment of the liquid crystal molecules may spread out of the region which overlaps the BM. On the contrary, as illustrated in FIG. 7, when a negative electric potential of −30 V is applied to the second shield electrode, sparse equipotential lines are formed. This reveals that the gate electric potential is weakened. Thus, in a case where such an electric field is formed, the possibility of disturbance in the alignment of the liquid crystal is very little on the side of the display region (the region not covered by the BM) even after a long-term energization.

Next materials and the production methods of each part are explained below.

As the materials of the supporting substrates 21 and 41, transparent materials such as glass or plastics may suitably be used. As the materials of the gate insulating film 22 and the passivation film 23, transparent materials such as silicon nitride, silicon oxide, and photosensitive acrylic resins may suitably be used. The gate insulating film 22 and the passivation film 23 may be formed, for example, by first forming a silicon nitride film by plasma enhanced chemical vapor deposition (PECVD), and then forming, on the silicon nitride film, a photosensitive acrylic resin film by die coating. The aperture provided in the passivation film 23 to form contacting portions may be formed by dry etching (channel etching).

Electrodes constituting the scanning signal lines 12, the data signal lines 13 and the TFT 53 may be formed by first forming a mono- or multi-layer(s) of metals such as titanium, chromium, aluminum, and molybdenum, or alloys thereof by sputtering or the like method, followed by patterning by a photolithography method or the like. These various wirings and electrodes may be efficiently produced if the wirings and electrodes formed in the same layer are made of the same material.

For the semiconductor layer 54 of the TFT 53, for example, a laminate of a high resistivity semiconductor layer ("i layer"), consisting of amorphous silicon, polysilicon, or the like, and a low resistivity semiconductor layer ("n+ layer"), consisting of $n^+$ amorphous silicon, an amorphous silicon to which impurities such as phosphorus is doped, may be used. Other materials which may be suitably used as the semiconductor layer 54 include oxide semiconductors such as IGZO (Indium-Gallium-Zinc-Oxygen). Such an oxide semiconductor has higher electron mobility than amorphous silicon, and therefore, it enables to reduce the size of the TFT 53. Thus, it is particularly suitable for a high definition liquid crystal display panel. The shape of the semiconductor layer 54 may be designed by first forming a film by, for example, a PECVD method, and then patterning it by, for example, a photolithography method.

The pixel electrodes 11, the common electrodes 15, the first shield electrode 71, the second shield electrode 72 may be formed by first forming a mono- or multi-layer(s) of transparent electroconductive materials such as indium tin oxide (ITO), indium zinc oxide (IZO), zinc oxide (ZnO), and tin oxide (SnO) or alloys thereof by sputtering or the like method, followed by patterning by, for example, a photolithography method. The slits formed in the pixel electrodes 11 may be formed simultaneously during patterning.

The materials which may suitably be used for the CFs 43 include a photosensitive resin (color resists) which transmits light corresponding to various colors. The material for the BMs 42 is not particularly limited as long as it has light shielding property, and may suitably include a resinous material containing a black pigment, and a metal material having light shielding property.

On either the TFT substrate 10 or the counter substrate 20 thus produced, a plurality of columnar spacers consisting of an insulation material are provided. Then, the TFT substrate 10 and the counter substrate 20 are bonded with each other via a sealing material. Between the TFT substrate 10 and the counter substrate 20, the liquid crystal layer is formed. When a drop filling method is applied, the liquid crystal material is dropped before the bonding of substrates, whereas when a liquid crystal filling vacuum injection method is applied, the liquid crystal material is injected after the bonding of substrates. Finally, a polarizing plate, a retardation film, or the like are laminated on the surface of each substrate on the opposite side to the liquid crystal layer 30, to complete a liquid crystal display panel. Furthermore, a gate driver, a source driver, a display controlling circuit, and the like may be installed in a liquid crystal display device, and a backlight unit may be combined. Thus, a liquid crystal display device may be produced according to need.

The structure of the liquid crystal display device of the Embodiment 1 may be observed by, for example, a scanning electron microscope.

Embodiment 2

The liquid crystal display device of the Embodiment 2 is the same as that of the Embodiment 1 except that the second shield electrode having a negative electric potential is not formed on the outer surface of the counter substrate, and only the first shield electrode having a positive electric potential is formed.

Figure 8:
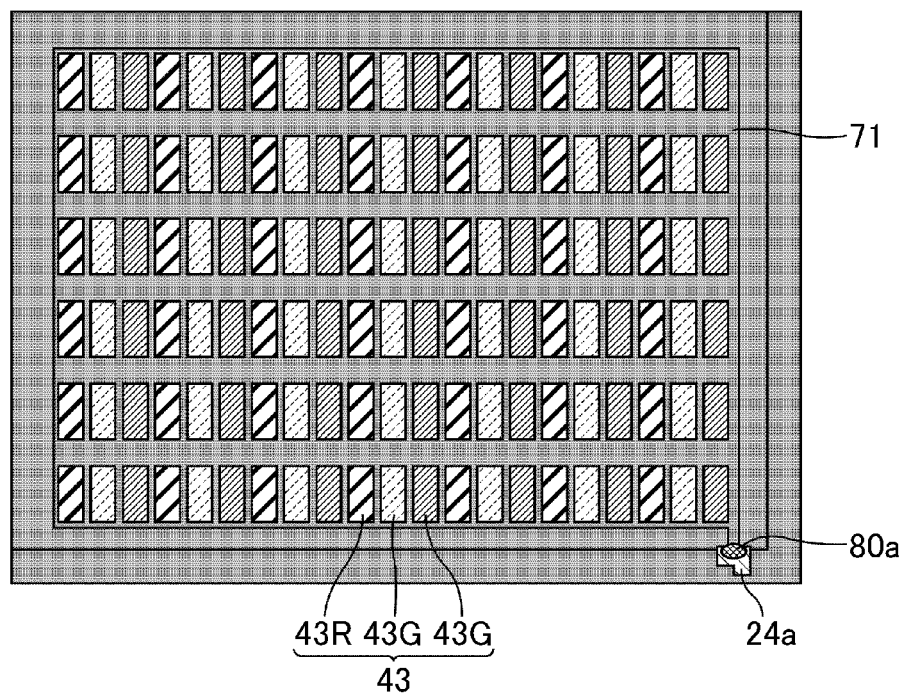
FIG. 8 is a schematic plan view illustrating a counter substrate in the Embodiment 2.

FIG. 8 is a schematic plan view illustrating the counter substrate in the Embodiment 2. As illustrated in FIG. 8, the first shield electrode 71, to which a positive electric potential is to be applied, is planar, and is provided in a wide region such that it overlaps whole of a plurality of color filters 43. The end parts of the first shield electrode 71 are connected to the terminal 24a via an electroconductive material (e.g. silver paste) 80a and are configured to be connected to the first controlling circuit of the circuit substrate which is exteriorly fixed.

Such a structure enables to suppress disturbance in the alignment of liquid crystal in a region (a display region) overlapping color filters 43, and to thereby decrease color unevenness in display.

Embodiment 3

The Embodiment 3 illustrates an example of a liquid crystal display device in an IPS mode. The liquid crystal display device of the Embodiment 3 is the same as that of the Embodiment 1 or 2 except that the structure of the electrodes for generating a transverse electric field is different. Specifically, in the Embodiment 3, a pair of electrodes for generating a transverse electric field are arranged on the same layer, and both of the electrodes include comb-tooth structures.

Figure 9:
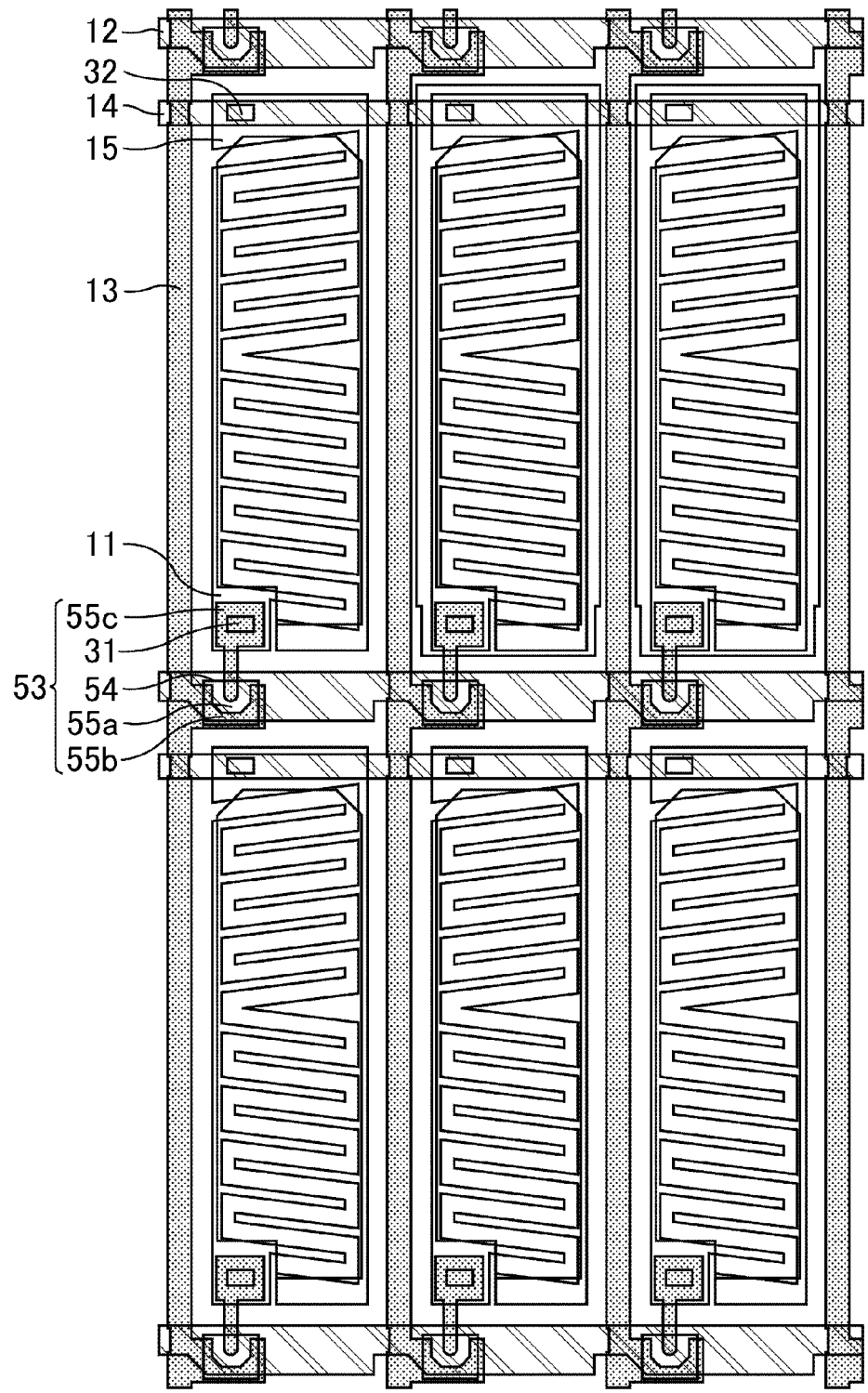
FIG. 9 is a schematic plan view illustrating a pixel structure of a TFT substrate in the Embodiment 3.
Figure 10:
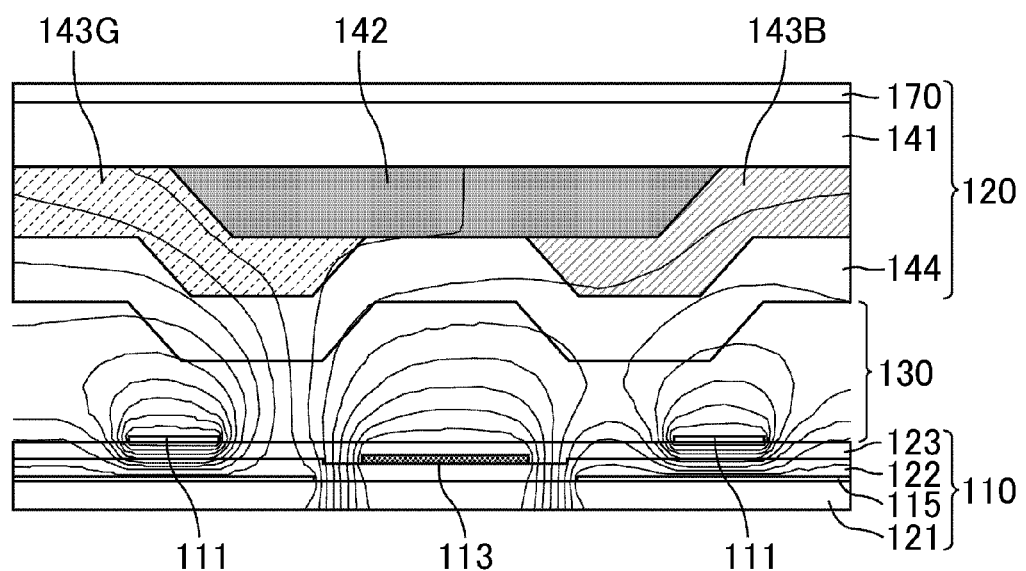
FIG. 10 is a schematic sectional view of a conventional liquid crystal display device in an FFS mode (Comparative Example) and has additional equipotential lines when the edge shapes of the CFs at the portions overlapping the BM are normal.
Figure 11:
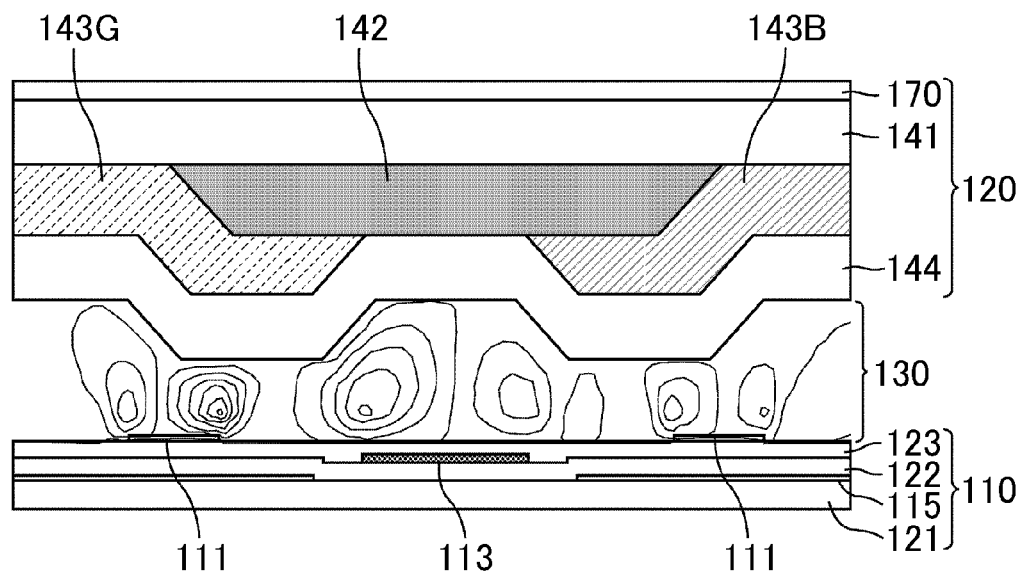
FIG. 11 is a schematic sectional view of a conventional liquid crystal display device in an FFS mode (Comparative Example) and has additional contour lines of the tilt distribution when the edge shapes of the CFs at the portions overlapping the BM are normal.
Figure 12:
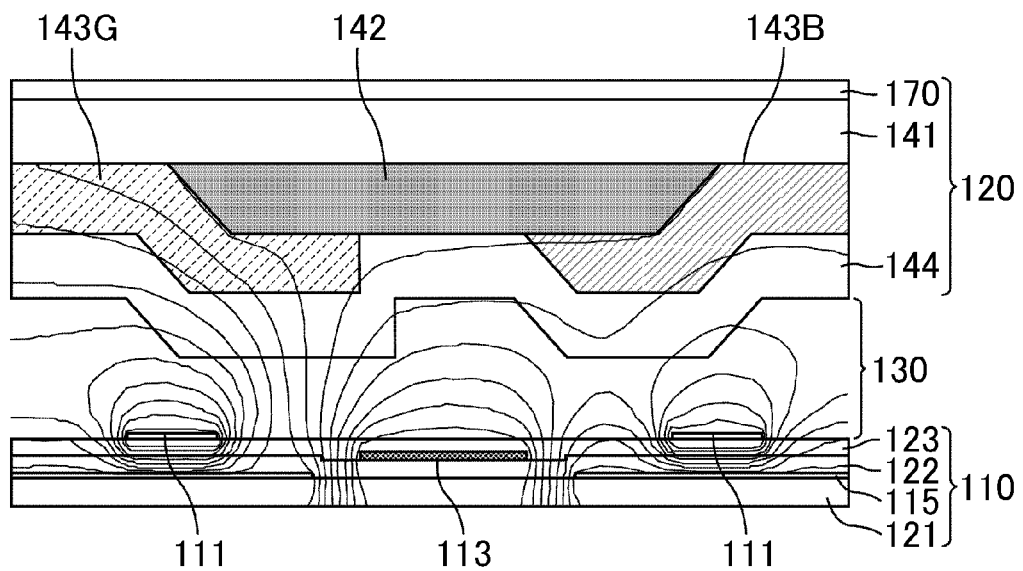
FIG. 12 is a schematic sectional view of a conventional liquid crystal display device in an FFS mode (Comparative Example) and has additional equipotential lines when the edge shapes of the CFs at the portions overlapping the BM are not normal.
Figure 13:
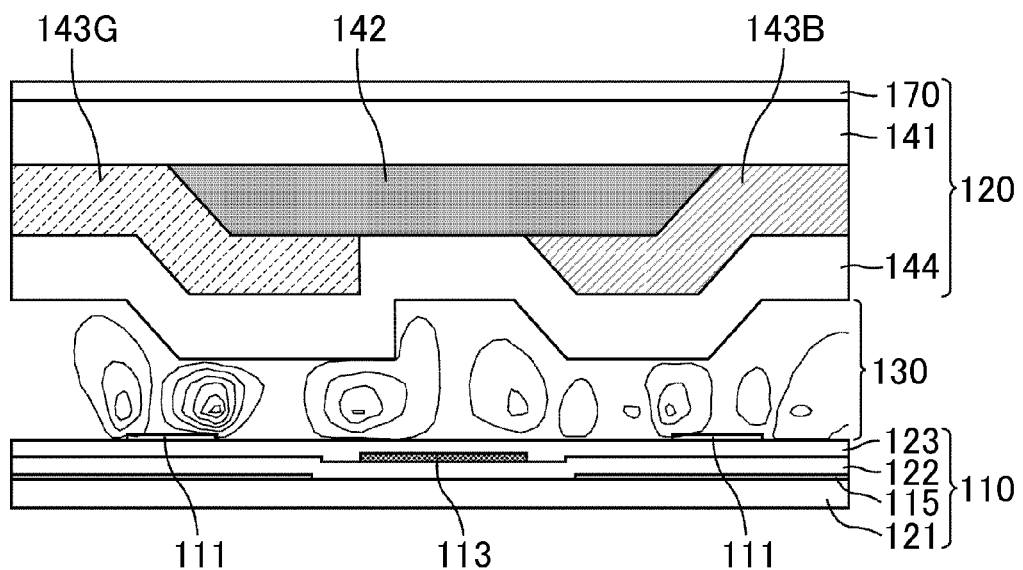
FIG. 13 is a schematic sectional view of a conventional liquid crystal display device in an FFS mode (Comparative Example) and has additional contour lines of the tilt distribution when the edge shapes of the CFs at the portions overlapping the BM are not normal.
Figure 14:
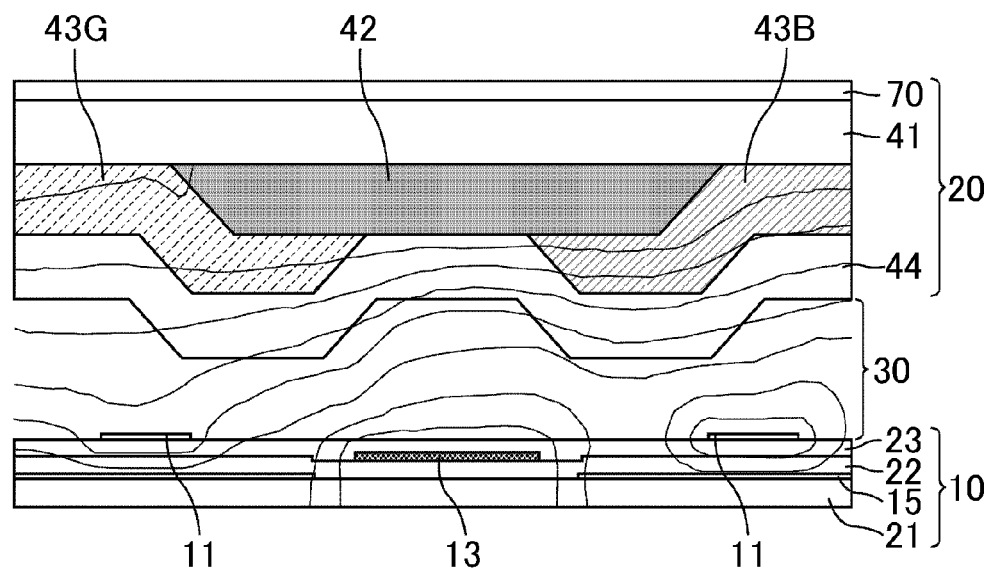
FIG. 14 is a schematic sectional view of a liquid crystal display device of the present invention in an FFS mode and has additional equipotential lines when the edge shapes of the CFs at the portions overlapping the BM are normal.
Figure 15:
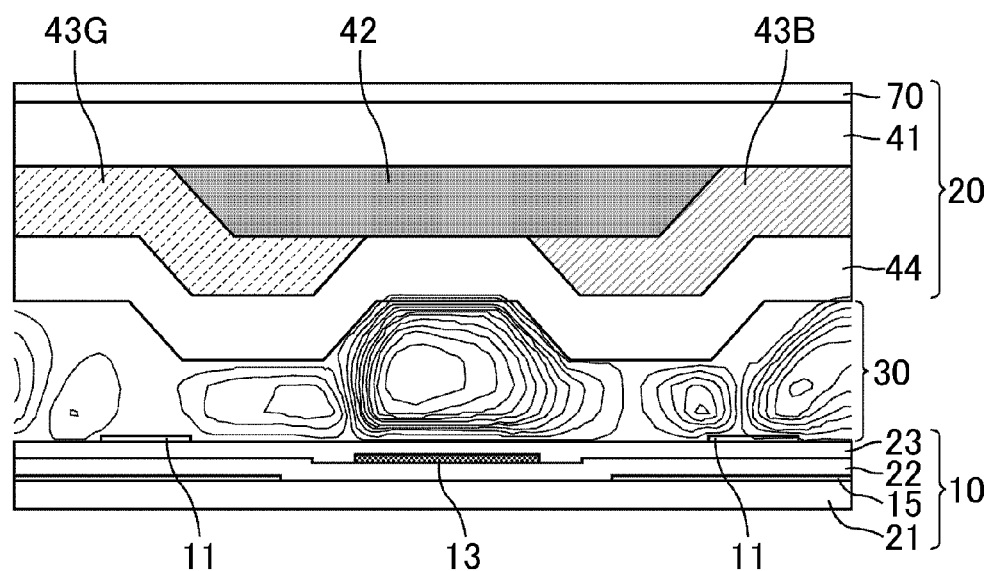
FIG. 15 is a schematic sectional view of a liquid crystal display device of the present invention in an FFS mode and has additional contour lines of the tilt distribution when the edge shapes of the CFs at the portions overlapping the BM are normal.
Figure 16:
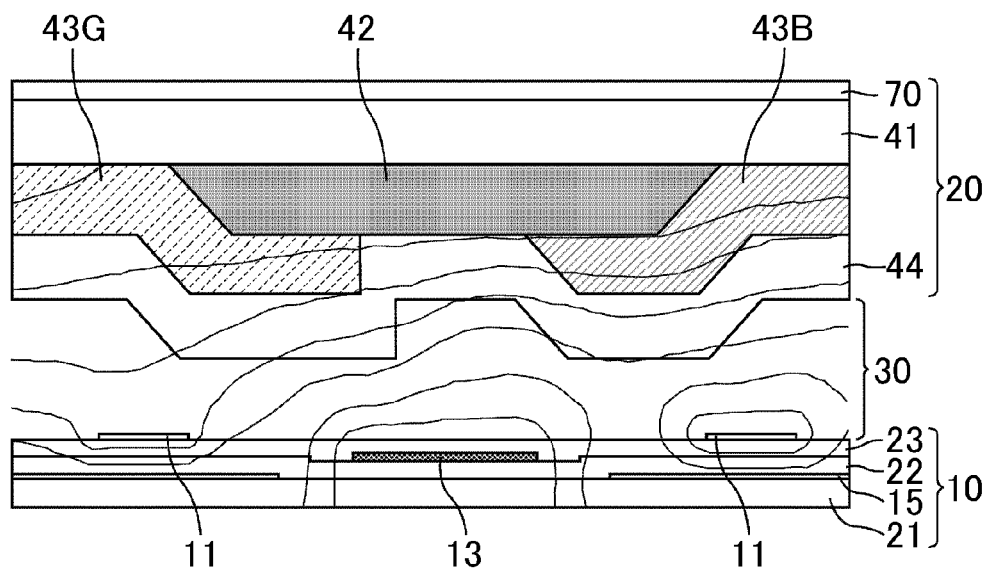
FIG. 16 is a schematic sectional view of a liquid crystal display device of the present invention in an FFS mode and has additional equipotential lines when the edge shapes of the CFs at the portions overlapping the BM are not normal.
Figure 17:
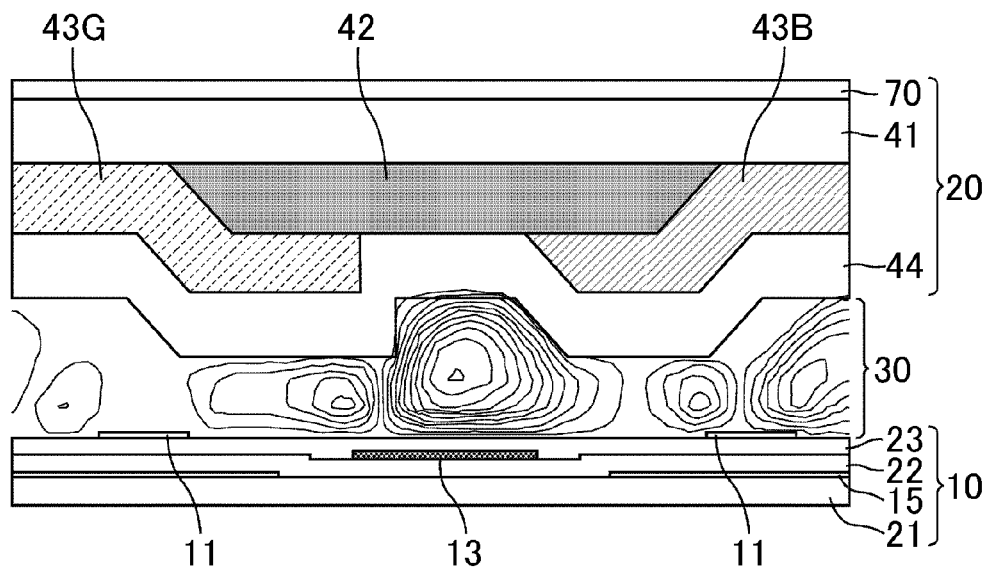
FIG. 17 is a schematic sectional view of a liquid crystal display device of the present invention in an FFS mode and has additional contour lines of the tilt distribution when the edge shapes of the CFs at a portion overlapping the BM are not normal.
Figure 18:
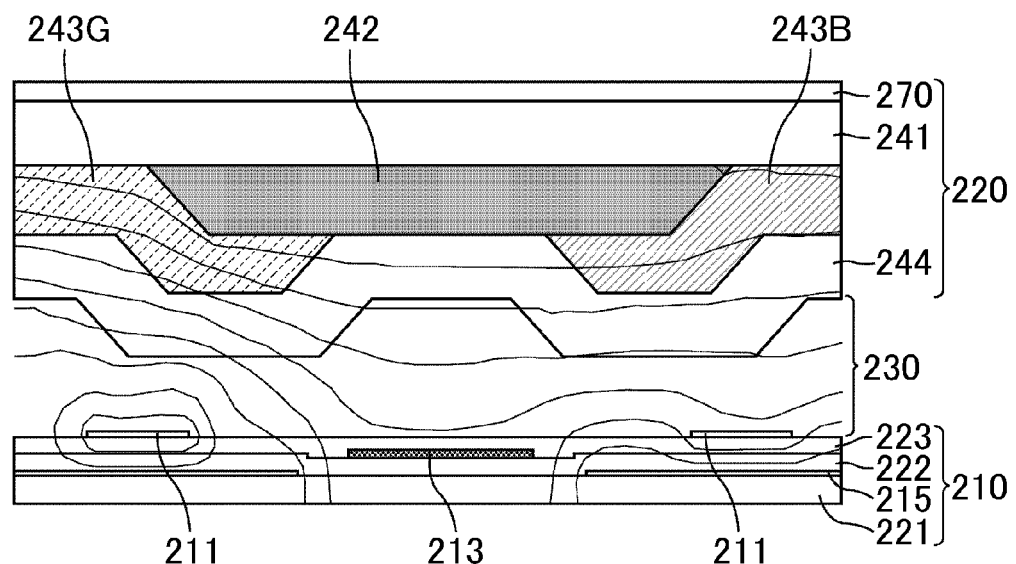
FIG. 18 is a schematic sectional view of a liquid crystal display device (Referential Example) in an FFS mode when a negative electric potential is applied to the shield electrode and has additional equipotential lines.
Figure 19:
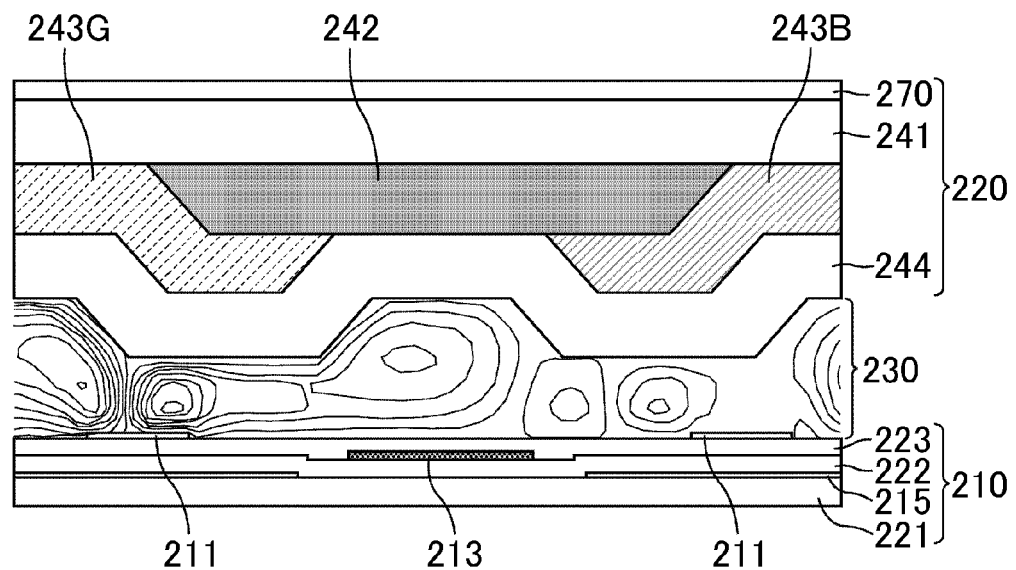
FIG. 19 is a schematic sectional view of a liquid crystal display device (Referential Example) in an FFS mode when a negative electric potential is applied to the shield electrode and has additional contour lines of the tilt distribution.

FIG. 9 is a schematic plan view illustrating the pixel structure of the TFT substrate in the Embodiment 3. FIG. 9 illustrates an example of a pixel structure in which a pixel consists of three sub pixels aligned in a row direction. The number and the way of arrangement of sub pixels in one pixel, however, are not particularly limited.

As illustrated in FIG. 9, the scanning signal lines 12 and the data signal lines 13 in the plan view of the TFT substrate in the Embodiment 3 are arranged such that they intersect each other and surround the pixel electrodes 11 and the common electrodes 15. In the neighborhood of the intersection of the scanning signal line 12 and the data signal line 13, the TFT (thin film transistor) 53 is provided. The structure of the TFT 53 is the same as that of the Embodiment 1. Between each pair of the scanning signal lines 12, common signal lines 14 are provided in parallel with the scanning signal lines 12. The common signal lines 14 are connected to the common electrodes 15 via the contacting portions 32 placed in an insulating film.

The pixel electrodes 11 are comb-tooth electrodes in which a plurality of the pixel electrodes are arranged in every region which is defined by the scanning signal lines 12 and the data signal lines 13, and the periphery thereof forms a zigzag shape. To the pixel electrodes 11, data signals are supplied at a determined timing via the TFTs 53. Each comb-tooth portion of the pixel electrodes 11 extends in a direction inclining by an angle of several degrees with respect to the direction which is parallel with the longitudinal direction of the scanning signal lines 12. The pixel electrodes 11 include shapes symmetrical to each other with respect to the border line which bisects the vertical side of the pixel electrodes 11. Such a symmetrical structure enables to arrange the alignment of the liquid crystal in a well-balanced manner.

The common electrodes 15 are comb-tooth electrodes in which a plurality of the common electrodes are arranged in every region which is defined by the scanning signal lines 12 and the data signal lines 13, and the periphery thereof forms a zigzag shape. To the common electrodes 15, common signals which are maintained at a constant value are supplied. Each comb-tooth portion of the common electrodes 15 extends in a direction inclining by an angle of several degrees with respect to the direction which is parallel with the longitudinal direction of the scanning signal lines 12. The common electrodes 15 include shapes symmetrical to each other with respect to the border line which bisects the vertical side of the common electrodes 15. Such a symmetrical structure enables to arrange the alignment of the liquid crystal in a well-balanced manner.

In the Embodiment 3, the pixel electrodes 11 and the common electrodes 15 include shapes symmetrical to each other with respect to the border line which bisects the horizontal side of the pixel electrodes.

In the embodiment 3, a transverse electric field is formed between the pixel electrodes 11 and the common electrodes 15. On the side of the counter substrate, shield electrodes are arranged. Thus, the Embodiment 3 can exert a similar effect to the Embodiment 1 or 2.

REFERENCE SIGNS LIST 10, 110, 210, 310: TFT substrate (Array substrate)
11, 111, 211, 311: Pixel electrode
11a: Slit
12, 112, 212, 312: Scanning signal line
13, 113, 213: Data signal line
14: Common signal line
15, 115, 215, 315: Common electrode
20, 120, 220, 320: Counter substrate
21, 41, 121, 141, 221, 241, 321, 341: Supporting substrate
22, 122, 222, 322: Gate insulating film (first insulating film)
23, 123, 223, 323: Passivation film (second insulating film)
24: Terminal
24a: Terminal (on the first shield electrode side)
24b: Terminal (on the second shield electrode side)
30, 130, 230, 330: Liquid crystal layer
31, 32: Contacting portion
42, 142, 242, 342: Black matrix (BM)
43, 143, 243, 343: Color filter (CF)
43R: Color filter
43G, 143G, 243G: Color filter
43B, 143B, 243B: Color filter
44, 144, 244, 344: Overcoat (OC) layer
45: Polarizing plate
50: Flexible substrate
53: TFT
54: Semiconductor layer
55a: Gate electrode
55b: Source electrode
55c: Drain electrode
60: Circuit substrate
70, 170, 270: Shield electrode
71: First shield electrode
72: Second shield electrode
80: Electroconductive material (Silver paste)
80a: Electroconductive material (on the first shield electrode side)
80b: Electroconductive material (on the second shield electrode side)
90: Liquid crystal display panel

The invention claimed is:

1. A liquid crystal display device, comprising:
a first substrate;
a second substrate; and
a liquid crystal layer interposed between the first substrate and the second substrate; wherein
the first substrate including a first shield electrode with translucency, a supporting substrate, a light shielding layer, and a colored layer;
the second substrate including a common electrode and a pixel electrode;
assuming that the liquid crystal layer is the center of the liquid crystal display device, the first shield electrode being provided outwardly from the supporting substrate when seen from the center;
the liquid crystal display device further comprising a first controlling circuit configured to apply a positive electric potential to the first shield electrode; and
the magnitude of the electric potential applied by the first controlling circuit is within the range of from +5 to +30 V.

2. A liquid crystal display device, comprising:
a first substrate;
a second substrate; and
a liquid crystal layer interposed between the first substrate and the second substrate; wherein
the first substrate including a first shield electrode with translucency, a supporting substrate, a light shielding layer, and a colored layer;
the second substrate including a common electrode and a pixel electrode;
the liquid crystal display device further comprising a first controlling circuit configured to apply a positive electric potential to the first shield electrode;
the liquid crystal display device further comprises a scanning signal line, a second shield electrode with translucency, and a second controlling circuit configured to apply a negative electric potential to the second shield electrode; and
assuming that the liquid crystal layer is the center of the liquid crystal display device, the first shield electrode being provided outwardly from the supporting substrate when seen from the center and the second shield electrode is provided outwardly from the supporting substrate when seen from the center, and
the second shield electrode overlappingly extends along the scanning signal line.

3. The liquid crystal display device according to claim 2, wherein the magnitude of the electric potential applied by the second controlling circuit is within the range of from −30 to −5 V.

4. The liquid crystal display device according to claim 2, wherein the first shield electrode overlappingly extends over a plurality of colored layers.

5. The liquid crystal display device according to claim 2, wherein the first shield electrode does not overlappingly extend over the scanning signal line, and extends in a direction parallel with the scanning signal line.

6. A liquid crystal display device, comprising:

a first substrate;

a second substrate;

a scanning signal line; and a liquid crystal layer interposed between the first substrate and the second substrate; wherein the first substrate including a first shield electrode with translucency, a supporting substrate, a light shielding layer, and a colored layer;

the second substrate including a common electrode and a pixel electrode;

assuming that the liquid crystal layer is the center of the liquid crystal display device, the first shield electrode being provided outwardly from the supporting substrate when seen from the center;

the liquid crystal display device further comprising a first controlling circuit configured to apply a positive electric potential to the first shield electrode; and the first shield electrode is provided in both a position not overlapping the scanning signal line and a position overlapping the scanning signal line.

7. The liquid crystal display device according to claim 1, wherein the liquid crystal display device is driven by a transverse electric field system.

8. The liquid crystal display device according to claim 2, wherein the liquid crystal display device is driven by a transverse electric field system.

9. The liquid crystal display device according to claim 6, wherein the liquid crystal display device is driven by a transverse electric field system.

* * * * *